United States Patent
Ayame

(10) Patent No.: US 7,121,736 B2
(45) Date of Patent: Oct. 17, 2006

(54) CONNECTION SOCKET FOR LIGHT SOURCE DEVICE USED FOR ENDOSCOPE

(75) Inventor: Daisuke Ayame, Saitama (JP)

(73) Assignee: Fujinon Corporation, Saitama (JP)

( * ) Notice: Subject to any disclaimer, the term of this patent is extended or adjusted under 35 U.S.C. 154(b) by 157 days.

(21) Appl. No.: 10/983,235

(22) Filed: Nov. 8, 2004

(65) Prior Publication Data
US 2005/0117849 A1    Jun. 2, 2005

(30) Foreign Application Priority Data
Nov. 6, 2003 (JP) .............................. 2003-376592

(51) Int. Cl.
G02B 6/36 (2006.01)
(52) U.S. Cl. .............................. 385/81; 385/53; 385/82; 385/89
(58) Field of Classification Search .................. 385/53, 385/81, 82, 89
See application file for complete search history.

(56) References Cited

U.S. PATENT DOCUMENTS

| 3,564,231 A | 2/1971 | Bruce et al. |
| 4,232,934 A | 11/1980 | Feinbloom |
| 4,249,799 A | 2/1981 | Iglesias |
| 4,397,523 A | 8/1983 | Feinbloom et al. |
| 5,594,826 A | 1/1997 | Wood et al. |
| 5,818,993 A * | 10/1998 | Chudoba et al. .............. 385/81 |

FOREIGN PATENT DOCUMENTS

| JP | 2-50447 | 2/1990 |
| JP | 11-183808 | 7/1999 |
| JP | 2001-125010 | 5/2001 |

* cited by examiner

Primary Examiner—Frank G Font
Assistant Examiner—Michael P. Mooney
(74) Attorney, Agent, or Firm—Young & Thompson

(57) ABSTRACT

A connection socket for detachably connecting distal ends of different, thin and thick, endoscopes light guides to a single light source device includes a socket block with a cylindrical aperture accepting a distal end of a light guide in an axial direction and retainer plates pivotally mounted within the socket block around the aperture for holding and retaining a distal end of an inserted light guide, each retainer plate having a peripheral edge facing the aperture that includes first and second retaining edge sections. With a thin light guide, the retainer plates retain the distal end with the first retaining edge sections. When a thick light guide is inserted within the aperture, the retainer plates are pushed and turned by a distal edge of the thick light guide, bringing the second retaining edge sections into close contact with the distal end, retaining the distal end of the thick light guide.

6 Claims, 7 Drawing Sheets

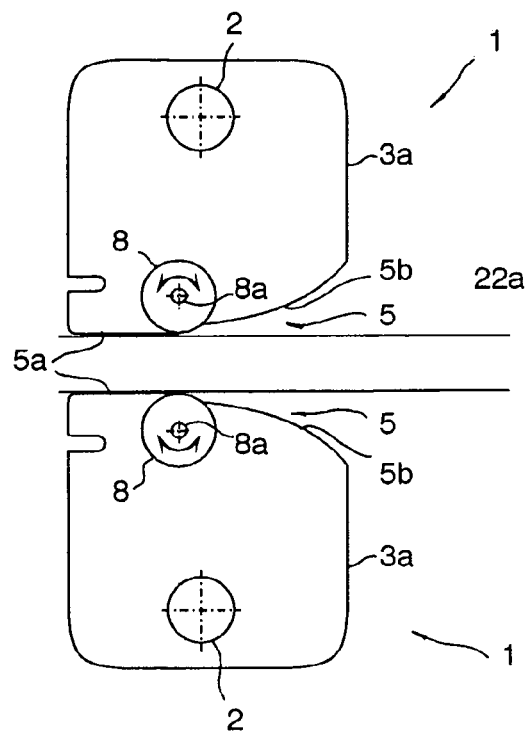
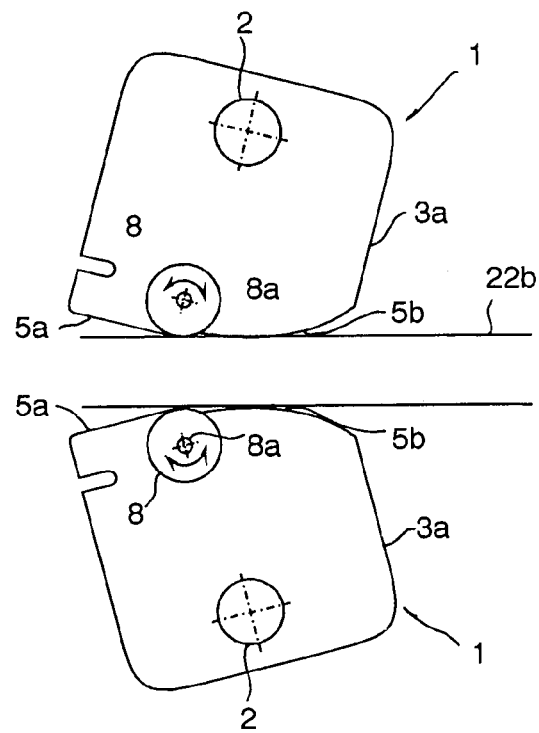

CONNECTION SOCKET FOR LIGHT SOURCE DEVICE USED FOR ENDOSCOPE

BACKGROUND OF THE INVENTION

1. Field of the Invention

The present invention relates to a connection socket structure for a light source device used for endoscopes through which light guide means of an endoscope is connected to the light source device to transmit light from the light source to the endoscope.

2. Description of Related Art

Typically, during the use of an endoscope, light is conducted to the endoscope from a light source through light guide means such as an optical fiber or an optical fiber bundle and sent out from an exit aperture at a distal end of the endoscope for a medical illumination purpose such as for illumination of the interior of a body cavity. The light guide means of the endoscope is connected to a light source device through a connection socket installed to the light source device. As seen in FIG. 7 showing a conventional light source device 100 by way of example, the light source device 100 includes a high intensity light source lamp 30 such as a metal halide or xenon arc lamp and an optical system 31 in axially alignment with each other in a light source housing 32. The optical lens system 31 collects and condenses light from the light source lamp 30. The light source device 100 is provided with a connection socket 101 through which light guide means 20 of an endoscope (not shown) is detachably connected to the light source device 100. The light guide means 20 includes a fiber bundle 21 with a distal end portion typically encased within a cylindrical connection ferrule and a coupling cap 23. For mechanical connection of the distal end of the light guide means 20, the coupling cap 23 is screwed, or otherwise bayonet-coupled, to the connection socket 101. Light from the light source lamp 30 in the light source device 100 is conducted to the endoscope through the light guide means 20. If the distal end of the light guide means 20 is too small in outer diameter to fit snugly into a slot or aperture of the connection socket 101 without backlash, the fiber bundle 21 of the light guide means 20 is misaligned in optical axis with the light source lamp 30, so as to cause a quantitative deficiency of light to be conducted to the endoscope through the light guide means 20. The quantitative deficiency of light leads directly to a deterioration of illumination for a body cavity. In these circumstances, the distal end of the optical fiber bundle or the single optical fiber is generally encased within a cylindrical connection ferrule for insertion into a slot or aperture within the connection socket 101 of the light source device 100. The cylindrical connection ferrule has a three-dimensional profile matching the interior profile of the aperture of the connection socket 101 so as to ensure that the cylindrical connection ferrule remains snugly mounted within the aperture of the connection socket 101 without rattling. The provision of the removable connection ferrule allows a single light source device to be used to provide light for a variety of endoscopes, each having a corresponding connection ferrule.

However, problems arise in many conventional endoscopes, particularly those having different cylindrical ferrules. In order to allow a single light source device for various endoscopes provided with cylindrical connection ferrules having different three-dimensional profiles, respectively, one of the conventional light source devices is provided with a plurality of connection sockets which have apertures different in interior profile one another but matching different three-dimensional profiles of the cylindrical connection ferrules respectively, or alternatively with a single connection socket having a slot or aperture variable in interior profile correspondingly to the different three-dimensional profiles of the cylindrical ferules. Examples of these conventional light source devices are disclosed in, for example, Japanese Unexamined Patent Publication Nos. 2-50447, 11-183808 and 2001-125010.

Reference is made to FIGS. 8A, 8B and 9 for the purpose of providing an understanding of a connecting configuration of light guide means of endoscopes having cylindrical connection ferrules different in outer diameter from one another to a light source device 100 such as shown in FIG. 7 through a connection socket installed to the light source device 100.

FIGS. 8A and 8B show one example of a connection socket 101 of a conventional light source device 100 (see FIG. 7) adapted for use with various endoscopes having different light guide means 20a and 20b, respectively. For example, one of the endoscopes shown in FIG. 8A has thin light guide means 20a including a fiber bundle 21a with a distal end portion encased within a cylindrical connection ferrule 22a and the other shown in FIG. 8B has thick light guide means 20b including a fiber bundle 21b with a distal end portion encased within a cylindrical connection ferrule 22b which is, for example in this example, greater in outer diameter than the cylindrical connection ferrule 22a of the thick light guide means 20a. The connection socket 101 comprises a connection socket housing 104 having a connection lip 104a and fixedly installed to the light source device 100, a positioning block 102 slidably received within the connection socket housing 104 and biasing means 103 such as a coil spring disposed between the positioning block 102 and the connection socket housing 104. The positioning block 102 has a tapering cone-shaped aperture 102a with a truncated end opening 102b formed therein and is urged toward the connection lip 104a by the biasing means 103. When connecting the thin light guide means 20a or 20b to the light source device 100, the distal end portion of the light guide means 20a or 20b is inserted into the tapering cone-shaped aperture 102a until the cylindrical connection ferrule 22a or 22b is brought into abutment with inner surface of the tapering cone-shaped aperture 102a and then the coupling cap such as shown in FIG. 7 is screwed to the connection lip 104a of the connection socket housing 104 of the connection socket 101. During screwing the connection cap, the connection ferrule 22a or 22b forces the positioning block 102 toward the optical lens system 31 the against the biasing means 103. When the connection cap is fully screwed to a given position with respect to the connection socket 101, the light guide means 20a or 20b is firmly connected to the light source device 100 and aligned with an optical axis Lx of the optical lens element 31 by the connection socket 101 and. In the connected position, an entrance aperture of the light guide means 20a or 20b is put in a plane in conformity with a focal plane of the optical lens system 31, where light from the light source lamp 30 is most efficiently collected and condensed.

More specifically, as shown in FIG. 8A, when connecting the thin light guide means 20a having the cylindrical connection ferrule 22 to the light source device 100, the cylindrical connection ferrule 22a is inserted into the tapering cone-shaped aperture 102 of the positioning block 102 until it is brought into abutment with the inner surface of the positioning block 102. Further, when the coupling cap is fully screwed to the connection lip 104a of the connection socket 101, the positioning block 102 is forced against the biasing means 103 and placed at a distance from the optical lens system 31 so as thereby to position the entrance end of the fiber bundle 21 encased within the cylindrical connection ferrule 22a of the thin light guide means 20a in the focal plane of the optical lens system 31. On the other hand, as shown in FIG. 8B, when connecting the thick light guide means 20b having the cylindrical connection ferrule 22b to the light source device 100, the cylindrical connection ferrule 22b is inserted into the tapering cone-shaped aperture 102 of the positioning block 102 until it is brought into abutment with the inner surface of the positioning block 102. Further, when the coupling cap is fully screwed to the connection lip 104a of the connection socket 101, the positioning block 102 is forced against the biasing means 103 and placed at a distance from the optical lens system 31, shorter than the distance in the case where the thick light guide means 20b having the cylindrical connection ferrule 22b larger in diameter than the cylindrical connection ferrule 22a of the thin light guide means 20a, so as thereby to position the entrance end of the fiber bundle 21b encased within the cylindrical connection ferrule 22b of the thick light guide means 20b in the focal plane of the optical lens system 31.

The provision of the tapering cone-shaped aperture 102a in the positioning block 102 allows the single light source device 100 to be commonly used to a variety of endoscopes which have different light guide means with distal end portions encased within cylindrical connection ferrules, respectively, different in outer diameter from one another.

FIG. 9 shows another example of a connection socket 101 of the conventional light source device 100 (see FIG. 7) adapted for use with various endoscopes. The connection socket 101 includes retainer means comprising a plurality of, for example three in this example, retainer units 105 arranged at regular angular intervals, namely 120°, in a plane perpendicular to an optical axis Lx of the optical lens system 31 (see FIG. 7). Each of the retainer units 105 comprises a generally square-shaped retainer plate 106 pivoted on a spring-loaded pivot shaft 107 at one corner thereof and a biasing means 108 such as a compression spring fixedly mounted to another corner of the square-shaped retainer plate 106 adjacent to the one corner. The spring-loaded pivot shafts 107, that are secured to a connection socket housing similar to that of FIGS. 8A and 8B, are arranged at regular angular intervals, namely 120°, on a circle having a center on the optical axis Lx of the optical lens system 31 in a plane perpendicular to the optical axis Lx of the optical lens system 31 and bias the square-shaped retainer plates 106 to pivotally turn in a counterclockwise direction in FIG. 9. The three biasing means 107 form an aperture for insertion of cylindrical connection ferrules into the connection socket among them and provide biasing force oriented toward the optical axis Lx of the optical lens system 31.

The pivoted retainer units 105a, 105b and 105c of the connection socket are pivotally turned in a clockwise direction about the spring-loaded pivot shafts 107, respectively, according to a diameter of cylindrical connection ferrule 22×of image guide means of an endoscopes and snugly hold them by the biasing means 108. The connection socket including the pivoted retainer units 105a, 105b and 105c allows light guide means of having cylindrical connection ferrules 22×different in diameter of various endoscopes to be connected to the single light source device.

However, problems arise in these conventional light source devices 100, particularly those provided with a plurality of connection sockets having different apertures matching different profiles of connection ferrules of light guide means of various endoscopes, it is hard to position entrance apertures of the different light guide means in a desired position, for example a focal plane of the optical lens system 31 wherein light from the light source lamp 30 is most efficiently collected and condensed. Alternatively, if the light source device 100 is designed to shift the light source lamp 30 in position according to respective light guide means, the light source device 100 is undesirably made bulky for securing a large space for the light source lamp 30.

Regarding the light source device 100 provided with the connection socket 101 including the positioning block 102 having a tapering cone-shaped aperture 102a for use with various endoscopes having light guide means different in diameter of their connection ferrules from one another, a light beam from the light source lamp 30 through the optical lens system 31 is partly blocked by the truncated end opening 102b of the tapering cone-shaped aperture 102a of the positioning block 102. In consequence, it is hard to direct light always most efficiently onto entrance apertures of the different light guide means.

Further, regarding the light source device 100 provided with the connection socket 101 including a plurality of, for example three pivoted retainer units 105a, 105b and 105c for use with various endoscopes having light guide means different in ferrule diameter from one another which provide biasing force toward the optical axis Lx of the optical lens system 31 in a plane perpendicular to the optical axis Lx of the optical lens system 31, force that is provided by the connection socket 101 and countervails against force applied to the light guide means in a direction perpendicular to a direction of insertion of the light guide means is too weak to hold the light guide means in axial alignment with the light source lamp 30 during use of the endoscope. If employing the pivoted retainer units 105a, 105b and 105c designed to provide sufficiently strong force for holding the light guide means, the biasing means 108 has to provide strong spring force or has to have high resilient force and, in consequence, is inescapably large in size.

SUMMARY OF THE INVENTION

It is therefore an object of the present invention to provide a connection socket for a single light source device for use with various endoscopes having light guide means with distal ends, respectively, different in diameter from one another for efficient conduction of light to the endoscope from a light source through the light guide means.

It is another object of the present invention to provide a connection socket for a single light source device that connects light guide means of various endoscopes to the light source device without rattling so as thereby to ensure that entrance apertures of the light guide means remains axially aligned with a light source lamp even during use of the endoscope.

The foregoing objects are accomplished by a connection socket for a light source device for detachably connecting endoscopes having different light guide means to the light source device therethrough so as thereby to conduct light from a light source lamp within the light source device into the light guide means. The connection socket comprises a socket block configured with a cylindrical aperture and retainer means installed in the socket block for holding and retaining a distal end of an light guide means inserted within the cylindrical aperture in an axial direction of the cylindrical aperture, the retainer means comprising a plurality of retainer plates which are arranged, desirably at regular angular intervals, around the cylindrical aperture and each of which is pivotally mounted on a pivot shaft fixed to the socket block, respectively, and has a peripheral edge facing the cylindrical aperture that comprises a first retaining edge section at a first distance from an axis of the pivot shaft, a second retaining edge section at a second distance shorter than the first distance from the axis of the pivot shaft and a shoulder section bridging the first and the second retaining edge section, wherein, when a distal end of a thin light guide means is inserted within the cylindrical aperture, the retainer plates hold and retain the distal end of the thin light guide means with the first retaining edge sections, thereby connecting the thin light guide means to the light source device and, when a distal end of a thick light guide means is inserted within the cylindrical aperture, the retainer plates are pushed at the shoulder section and turned about the pivot shafts, respectively, by a distal edge of the thick light guide means to bring the second retaining edge sections into close contact with a distal end of said thick light guide means so as to hold and retain the distal end of the thick light guide means with the second retaining edge sections, thereby connecting the thick light guide means to the light source device.

According to the connection socket of the present invention, since the retainer means comprises a plurality of pivoted retainer plates each of which is configured with a peripheral retaining edge comprising the first and second retaining edge sections and which are arranged around the cylindrical aperture, the retainer means firmly holds and retains a distal end of a thin light guide means at a plurality of circumferential points with the first retaining edge sections of the pivoted retainer plates and a distal end of a thick light guide means at a plurality of circumferential points with the second retaining edge sections of the pivoted retainer plates. Therefore, whichever the light guide means is thin or thick, the light guide means is firmly held and retained within the connection socket without rattling.

Although the retainer plates are turned with thrust force applied due to insertion of the light guide means in an axial direction of the cylindrical aperture, they are prevented from being forced to turn with external force such as weight of a ferrule covering the distal end of the light guide means and/or force produced due to operation of the endoscope imparted thereto while holding and retaining the light guide means, so that the light guide means connected to the light source device through the connection socket is prevented rattling during operation of the endoscope.

BRIEF DESCRIPTION OF THE DRAWINGS

The foregoing and other objects and features of the present invention will be clearly understood from the following detailed description when reading with reference to the accompanying drawings, wherein the same reference signs have been used to denote same or similar parts throughout the drawings, and in which:

FIGS. 6A and 6B are illustration showing connecting configuration of light guide means of an endoscope to the light source device through a connection socket according to still another embodiment of the present invention;

DETAILED DESCRIPTION OF THE PREFERRED EMBODIMENTS

Figure 1:
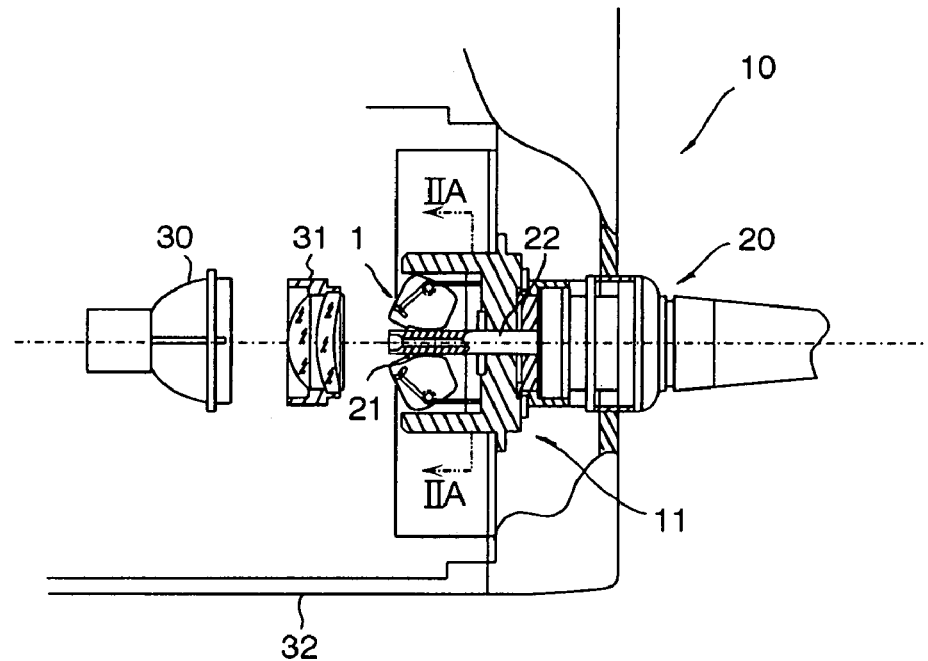
FIG. 1 is a side view of a light source device with a connection socket according to an embodiment of the present invention which is partly shown in longitudinal section.
Figure 7:
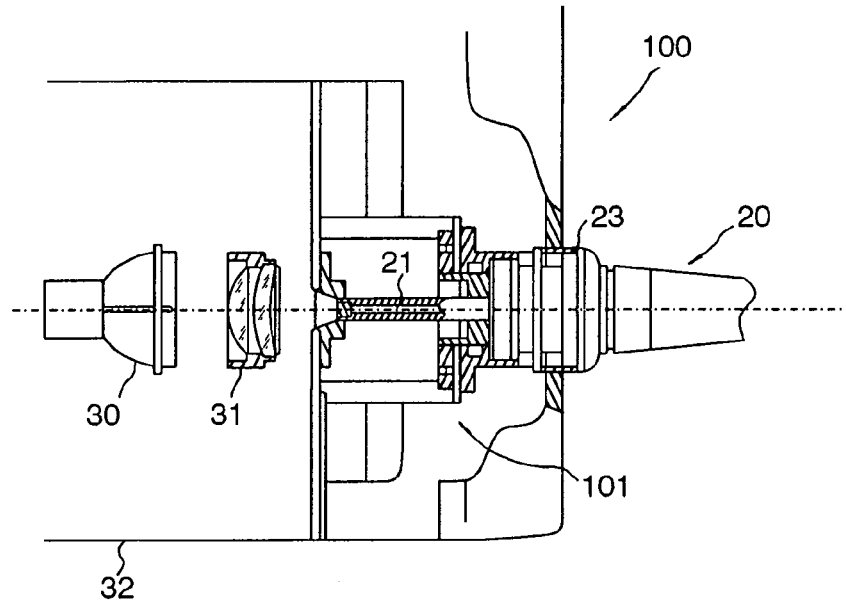
FIG. 7 is a side view of a conventional light source device with light guide means of an endoscope connected thereto which is partly shown in longitudinal section.
Figure 8A:
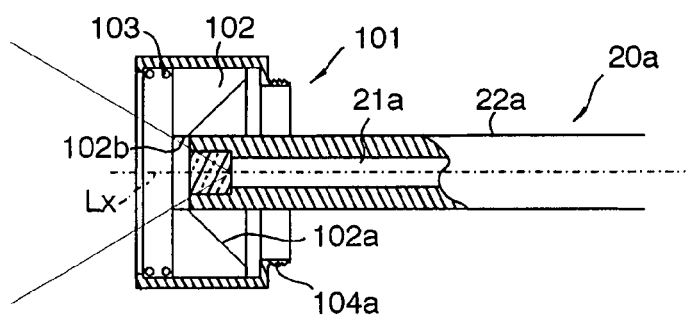
FIG. 8A is an illustrations showing connecting configuration of a small size of light guide means of an endoscope to the light source device through a prior art connection socket.
Figure 8B:
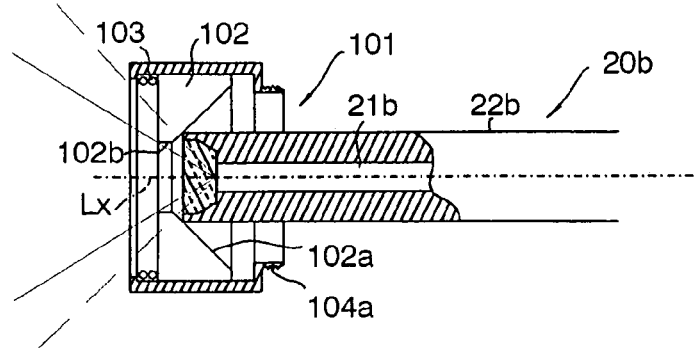
FIG. 8B is an illustrations showing connecting configuration of a large size of light guide means of an endoscope to the light source device through the prior art connection socket.
Figure 9:
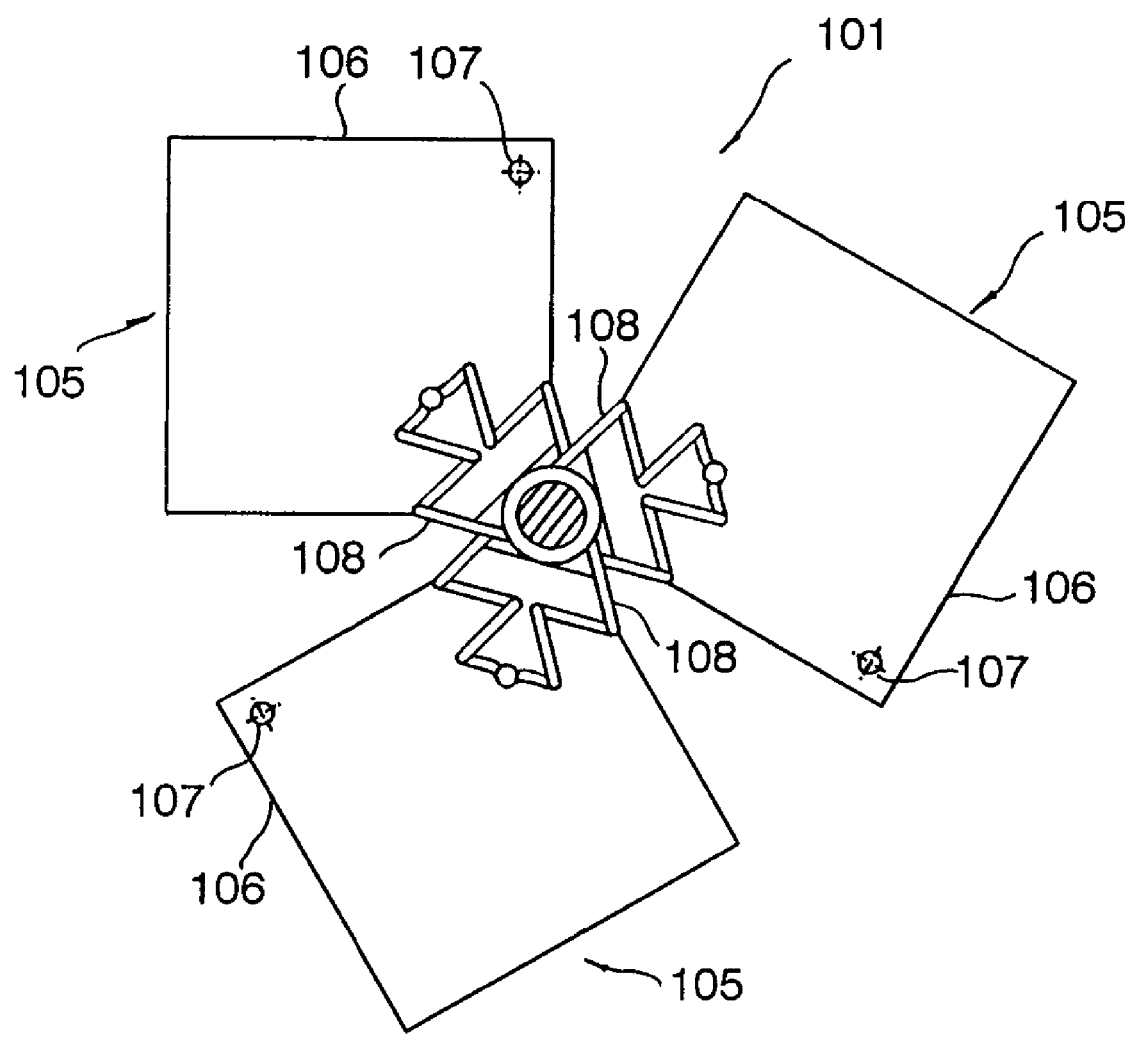
FIG. 9 is an illustration showing an arrangement of retainer means of another prior art connection socket.

Referring to the accompanying drawings in detail, and in particular, to FIG. 1 showing a light source device 10 which is similar to the conventional one such as shown in FIG. 7 except for a connection socket 11 of the present invention, the light source device 10 includes a high intensity light source lamp 30 and an optical system 31 in axially alignment with each other in a light source housing 32. The optical lens system 31 which may include one or more optical elements collects and condenses light from the light source lamp 30. The connection socket 101 is fixedly installed within the light source housing 32. Light guide means 20 of an endoscope (not shown) is detachably connected to the light source device 10 through the connection socket 11. The light guide means 20 includes a fiber bundle 21 with a distal end portion encased within a cylindrical connection ferrule 22. Light from the light source lamp 30 in the light source device 10 is collected and condensed onto an entrance aperture of the light guide means 20 and conducted to the endoscope through the light guide means 20.

Figure 2A:
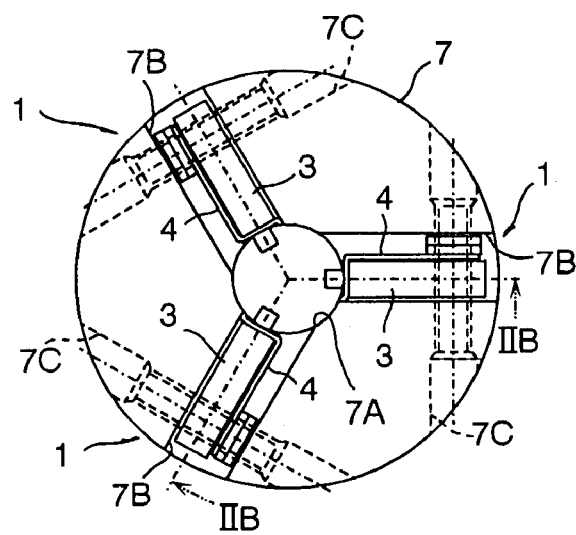
FIG. 2A is a cross-sectional view of the connection socket taken along a line IIA—IIA of FIG. 1.
Figure 2B:
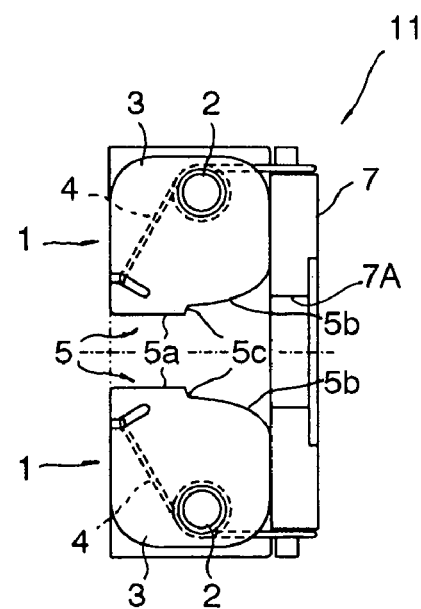
FIG. 2B is a longitudinal-sectional view of the connection socket taken along a line IIB—IIB of FIG. 2A.

FIGS. 2A and 2B show the connection socket 11 in cross-section and longitudinal-section, respectively. As shown in FIG. 2A, the connection socket 11 comprises a cylindrical socket block 7 having a cylindrical bore or aperture 7A having a center line in alignment with an optical axis Lx of the optical lens system 31 (see FIG. 1) for insertion of the light guide means 20, a plurality of, for example three in this embodiment, radial grooves 7B arranged at regular angular intervals, namely 120°, and cross bores 7C transversely crossing the radial grooves 7B, respectively. Each radial groove 7B opens into the cylindrical aperture 7A and the interior of the light source housing 32 and, however, is closed by outer walls at its top and outer side. The cylindrical socket block 7 is provided with retainer means for holding the cylindrical connection ferrule 22 of the light guide means 20 inserted into the cylindrical aperture 7A so as thereby to connect the light guide means to the light source device 10. The retainer means comprises a plurality of, namely three in this embodiment, retainer units 1 disposed in the radial grooves 7B, respectively. Each retainer unit 1 comprises a pivot shaft 2 fixedly mounted in the cross bore 7C, a generally rectangular-shaped retainer plate 3 pivoted on the pivot shaft 2 and biasing means 4 such as an expansion spring mounted between the retainer plate 3 and the cylindrical socket block 7 so as to force the retainer plate 3 toward the exterior of the light source housing 32. As clearly shown in FIG. 2B, pivotal turn of the retainer plate 3 is limited in a direction toward the exterior of the light source housing 32 by the top wall of the cylindrical socket block 7 but is allowed in a direction toward the interior of the light source housing 32. The retainer plate 3 has a retaining peripheral edge 5 at a side adjacent to the cylindrical aperture 7A of the cylindrical socket block 7. Specifically, the retaining peripheral edge 5 includes a first retaining edge section 5a and a second retaining edge section 5b which are bridged by a shoulder section 5c. The first retaining edge section 5a is in parallel with an axial direction of the cylindrical aperture 7A of the cylindrical connection block 7 in alignment with the optical axis Lx of the optical lens system 31 when the retainer plate 3 is in a rest position where the retainer plate 3 is forced against the top wall of the cylindrical socket block 7 by the biasing spring 4, in other words, where the retaining plates 3 are put ready for holding and retaining a connection ferule of a thin light guide means as will be described later. The second retaining edge section 5b comprises a circular curve that has a curvature radius smaller than a distance between an axial line of the pivot shaft 2 and the first retaining edge section 5a of the retainer plate 3 in the rest position and is centered at a point on an axial line of the pivot shaft 2. The shoulder section 5c extends perpendicularly from the first retaining edge section 5a toward the pivot shaft 2 so as to bridge these first and second retaining edge sections 5a and 5b. In other words, while the retainer plate 3 are in a rest position (see FIGS. 2B, 3A and 4A), the shoulder section 5c extends in or in the close proximity to a plane perpendicular to the axial line of the cylindrical aperture 7A of the cylindrical socket block 7 and including the axis of the pivot shaft 2. As will be described later, the first retaining edge sections 5a of the retainer plates 3 of the retainer means are used to hold a cylindrical connection ferrule 20a (see FIG. 4A) of an image guide means 20 comparatively small in diameter. On the other hand, the second retaining edge sections 5b of the retainer plates 3 of the retainer means are used to hold a cylindrical connection ferrule 20b (see FIG. 4B) greater in diameter than the cylindrical connection ferrule 20a of the light guide means 20a.

Figure 3A:
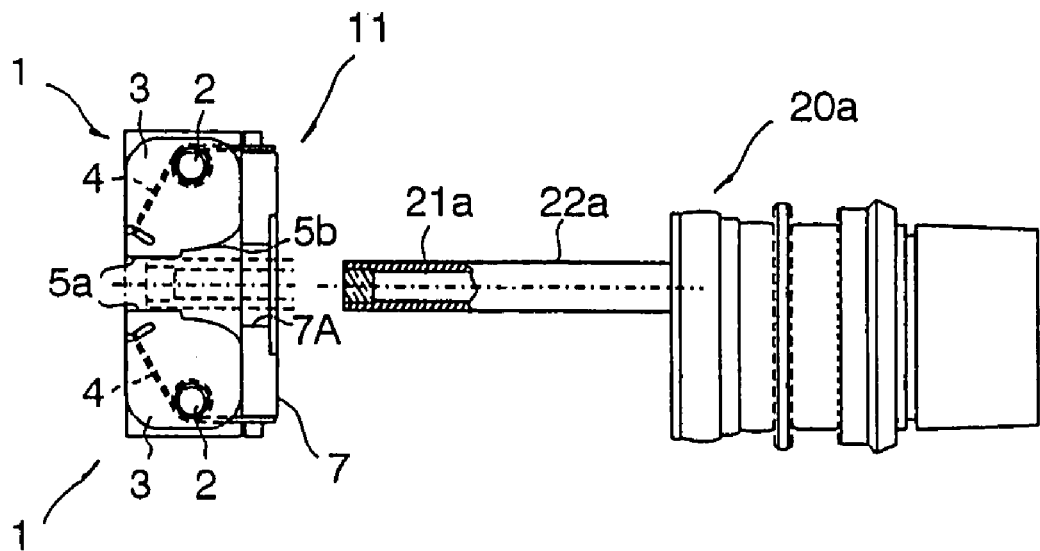
FIGS. 3A and 3B are illustrations showing connecting configuration of a thin light guide means of an endoscope to the light source device through the connection socket shown in FIGS. 2A and 2B.
Figure 3B:
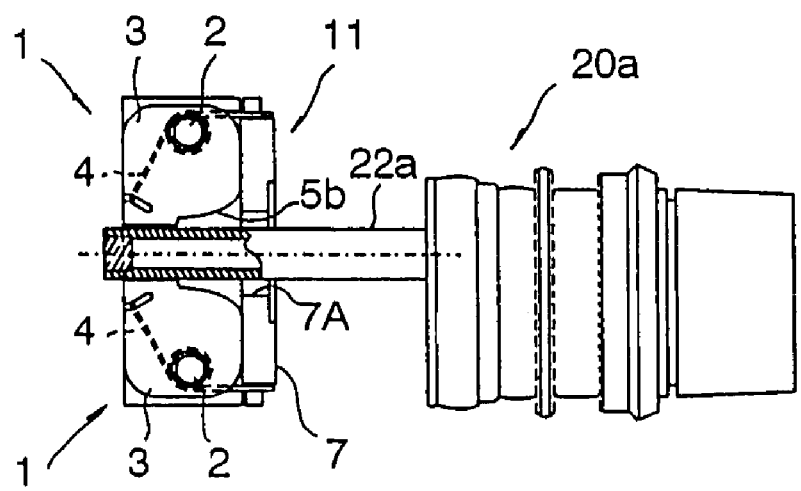
Figure 4A:
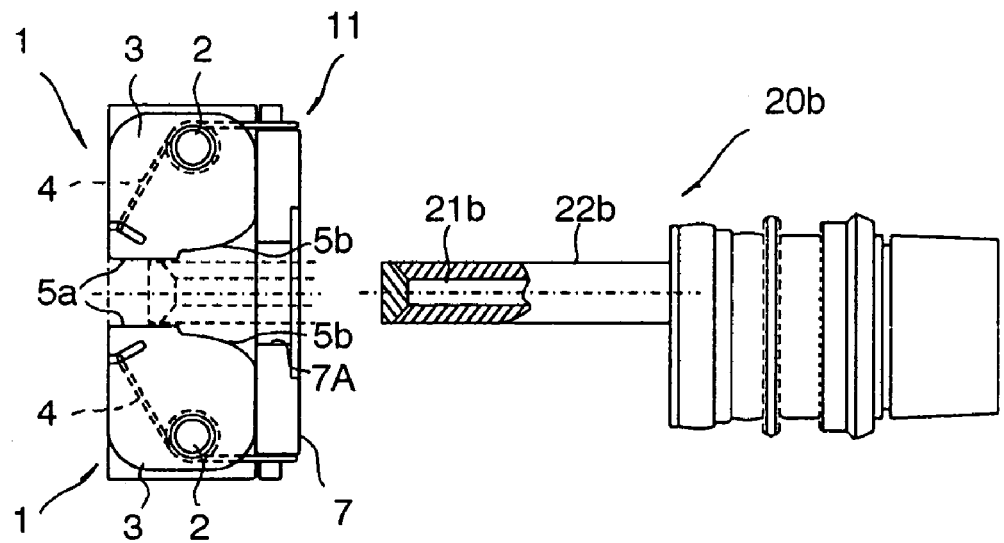
FIGS. 4A and 4B are illustrations showing connecting configuration of a thick light guide means of another endoscope to the light source device through the connection socket shown in FIGS. 2A and 2B.
Figure 4B:
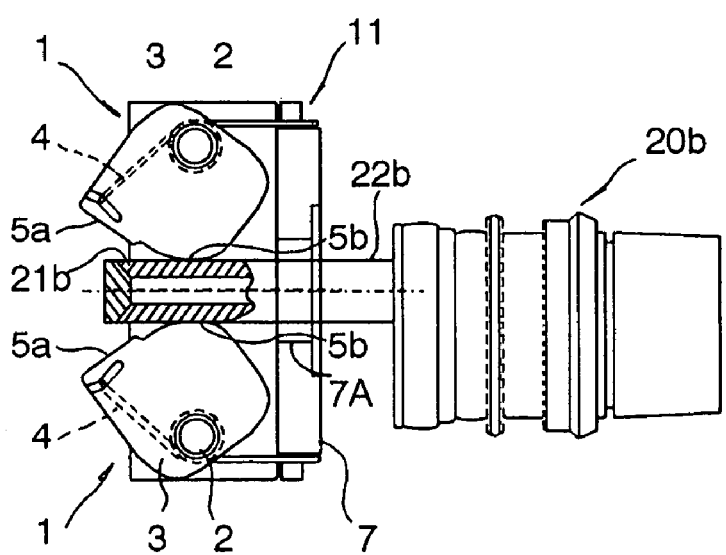

Operation of the connection socket 11 described above through which endoscopes are connected to the single light source device 10 placed in a vertical position or in a recumbent position will be hereinafter described. As shown in FIGS. 3A and 3B illustrating a connecting configuration of an endoscope (not shown) having thin light guide means 20a including a connection ferrule 22a with a relatively small diameter to the light source device 10, when inserting the connection ferrule 22a of the thin light guide means 20a into the cylindrical aperture 7A of the cylindrical socket block 7 of the connection socket 11, the connection ferrule 22a of the thin light guide means 20a is plugged in the cylindrical aperture 7A without abutting the shoulder sections 5c, and hence without turning the retainer plates 3 of the retainer means in any direction. In a position where the connection ferrule 22a is fully plugged in the cylindrical aperture 7A by a given length, it is snugly held and retained at three points by the three retainer units 1 of the retainer means, more specifically by the first retaining edge sections 5a of the three retainer plates 3 as shown in FIG. 3B, so as thereby to connect the thin light guide means 20a firmly to the light source device 10. On the other hand, as shown in FIGS. 4A and 4B illustrating a connecting configuration of thick light guide means 20b having a connection ferrule 22b with a diameter greater than the connection ferrule 22a of the thin light guide means 20a, when inserting the connection ferrule 22b of the thick light guide means 20b into the cylindrical aperture 7A of the cylindrical socket block 7 of the connection socket 11, the connection ferrule 22b abuts the shoulder sections 5c of the retainer plates 3 of the retainer means as shown by phantom line in FIG. 4A. Further insertion of the connection ferule 22b forces the retainer plates 3 toward the interior of the light source housing 32 against the biasing springs 4 and then brings the second retaining edge section 5b into close contact with the connection ferrule 22b. During further insertion, the retainer plates 3 of the retainer means are turned in the same direction keeping the second retaining edge section 5b in close contact with the connection ferrule 22b. When the connection ferrule 22b is fully inserted into the cylindrical aperture 7A by a given length, it is snugly held and retained at three points by the second retaining edge sections 5b of the three retainer plates 3 of the three retainer units 1 of the retainer means as shown in FIG. 4B, so as thereby to connect the thick light guide means 20b firmly to the light source device 10.

When the fiber bundle 21b of the thick light guide means 20b is drawn out to disconnect the light guide means 20b from the light source device 10, the biasing spring 4 forces the retainer plates 3 until the retainer plates 3 lean against the top wall of the cylindrical socket block 7 so as thereby to be located in the rest position shown in FIG. 4A If the biasing spring 4 is too strong, the connection ferrule 22b of the thick light guide means 20b must be pushed into the cylindrical aperture 7A of the cylindrical socket block 7 with strong thrust force in order to turn the retainer plate 3. Therefore, the biasing spring 4 is desired to have spring force, or resilient force, sufficiently weak inasmuch as forcing the retainer plate 3 to reliably return the rest position.

During use of the endoscope having the thin light guide means 20a or 20b connected to the light source device 10 through the connection socket 11, the light guide means 20a or 20b at the connection ferrule 22a or 22b causes lateral force oriented approximately perpendicularly to the axial line of the cylindrical aperture 7A of the cylindrical socket block 7. The lateral force acts on the pivot shafts 2 through the retainer plates 3 of the retainer means. The connection socket 11 is adapted to turn the retainer plates 3 not with force applied in a direction toward the pivot shafts 2 from the peripheral edge 5 of the retainer plates 3 but with thrust force applied to the connection ferrule 22b of the thick light guide means 20b during plug-in insertion of the connection ferrule 22b into the cylindrical aperture 7A. In consequence, the thick light guide means 20b with the connection ferrule 2b held and retained by the retainer plates 3 does not rattle due to operation of the endoscope 20b.

For reliable connection of the light guide means to the light source device 10 without rattling, it is preferred for the connection socket 11 to have the retainer means including three or more retainer units 1 arranged around the cylindrical aperture 7A of the cylindrical socket block 7, more preferably three or more retainer units 1 arranged at regular angular intervals around the cylindrical aperture 7A of the cylindrical socket block 7 or arranged symmetrically with respect to the axial line of the cylindrical aperture 7A of the cylindrical socket block 7.

Figure 5:
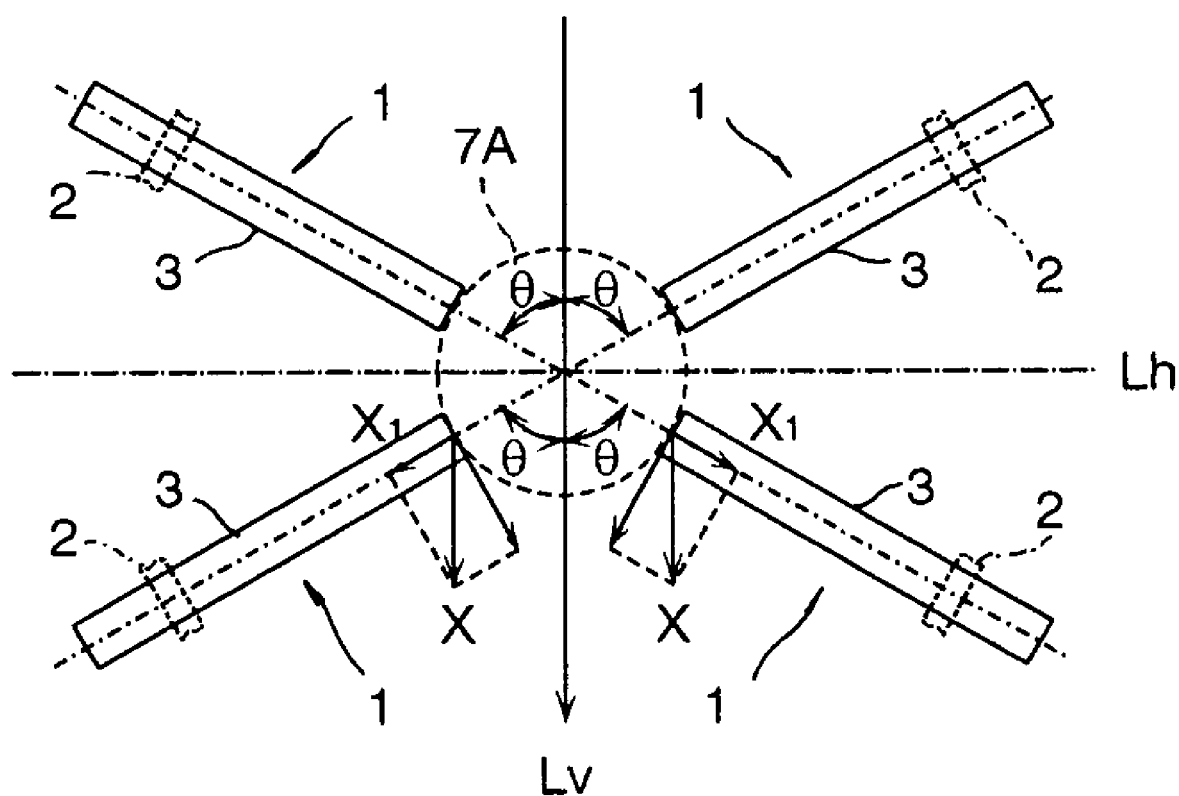
FIG. 5 is an illustration showing an arrangement of retainer means of a connection socket according to another embodiment of the present invention.

Referring to FIG. 5 showing an alternative arrangement of retainer units 1 of the retainer means of the connection socket 11, there are provided four retainer units 1 disposed within radial grooves 7B around the cylindrical aperture 7A in the cylindrical socket block 7.

In the connecting configuration where the thick light guide means 20b is connected to the light source device 10 by holding and retaining the connection ferrule 22b by the retainer plates 3 of the retainer means of the connection socket 11, when the connection ferrule 22b is inserted into the cylindrical aperture 7A in the cylindrical socket block 7 and reaches the shoulder sections 5c of the peripheral edges 5 of the respective retainer plates 3, it causes the retainer plates 3 to turn so as thereby to hold and retain the connection ferrule 22b with the second retaining edge sections 5b of the peripheral edges 5 thereof. The retainer plates 3 holding and retaining the connection ferrule 22b of the thick light guide means 20b is subject to resulting force of ferrule's own weight and force produced due to operation of the endoscope.

In particular, in the case where the light source device 10 is placed in a recumbent position, the connection ferrule 22b is subject to its own weight and/or force produced due to operation of the endoscope in a vertical direction and, in consequence, imparts vertical force to the retainer plates 3. As shown in FIG. 5, when vertical force X is imparted to the retainer plate 3 in particular below the connection ferrule 22b, the retainer plates 3 receive component force $X_1$ of the vertical force X according to an angle of the retainer plate 3 with respect to the vertical direction. When the vertical force X is too strong, the component force $X_1$ that the retainer plate 3 receives possibly become too strong to keep the retainer plate 3 from turning even after completion of the connection of the thick light guide means 20b to the light source device 10.

Although an occurrence of such turning of the retainer plate 3 can be prevented by employing biasing springs 4 strong sufficiently enough to be conquerable against the component force $X_1$ of the vertical force X, nevertheless, the employment of such the strong biasing springs 4 is unrealistic from a practical standpoint since strong thrust force is necessary for facilitating insertion of the connection ferrule 22b into the cylindrical aperture 7A in the cylindrical socket block 7.

In consideration of the above circumstances, in order that the retainer plate 3 receives component force $X_1$ of the vertical force X from the connection ferrule 22b of the thick light guide means 20b as less as possible, it is preferred for the retainer means to include two pairs of symmetrically arranged retainer units 1 as shown in FIG. 5. That is, each alternative retainer units 1 are symmetrical in position with respect to a point of symmetry on the axial line of the cylindrical aperture 7A of the cylindrical socket block 7. More specifically, a pair of adjacent retainer units 1 are arranged below a horizontal line Lh perpendicular to the axial line of the cylindrical aperture 7A of the cylindrical socket block 7 and symmetrically apart on opposite sides from a vertical line Lv perpendicular to the axial line of the cylindrical aperture 7A of the cylindrical socket block 7, and another pair of the retainer units 1 are arranged above the horizontal line Lh and symmetrically apart on opposite sides from the vertical line Lv. To put the symmetric arrangement in another way, the retainer units 1 are arranged at regular angular intervals θ greater than 45° but less than 90° from the vertical line Lv. According to the symmetrical arrangement of the retainer means, component force $X_1$ of the vertical force X that the retainer plate 3 of the retainer unit 1, below or above the horizontal line perpendicular to the axial line of the cylindrical aperture 7A, receives in a direction toward the pivot shaft 2 is minimized and is less than a half of the vertical force X at the maximum.

FIGS. 6A and 6B show alternative embodiment of the retainer means. As shown, the retainer means of this embodiment is almost similar to that of the previous embodiment except that a roller 8 is employed in place of the shoulder section 5c bridging the first and second retaining edge sections 5a and 5b of the retaining peripheral edge 5. That is, the roller 8 is mounted on a pivot shaft 8a fixed to the retainer plate 3a so that the circular periphery of the roller 8 is circumscribed by extensions of both first and second retaining edge sections 5a and 5b.

In operation of the connection socket 11 provided with the retaining means including the retainer plates 3a shown in FIGS. 6A and 6B, when inserting the connection ferrule 22a of the thin light guide means 20a into the cylindrical aperture of the cylindrical socket block (not shown) of the connection socket 11 by a given length, the connection ferrule 22a is snugly held and retained at three points by the first retaining edge sections 5a of the three retainer plates 3 of the retainer units 1 as shown in FIG. 6A, so as thereby to connect the thin light guide means 20a firmly to the light source device 10. On the other hand, when inserting the connection ferrule 22b of the thick light guide means 20b into the cylindrical aperture of the cylindrical socket block of the connection socket 11, the connection ferrule 22b are brought into abutment against the circular peripheries of the rollers 8. Further insertion of the connection ferule 22b forces the retainer plates 3 to turn about the pivot shafts 2 against the biasing springs (not shown) simultaneously with rotating the rollers 8 about the pivot shafts 8a and then brings the second retaining edge sections 5b into close contact with the connection ferrule 22b. When inserting the connection ferrule 22b into the cylindrical aperture 7A by a given length, the connection ferrule 22b is snugly held and retained at three points by the second retaining edge sections 5b of the three retainer plates 3 of the three retainer units 1 as shown in FIG. 6B, so as thereby to connect the thick light guide means 20b firmly to the light source device 10.

When drawing out the connection ferrule 20b of the thick light guide means 20b, the connection ferrule 22b causes the rollers 8 to rotate about the pivot shafts 8a. This rotation of the roller 8 reduces frictional force against the connection ferrule 8, so as thereby to facilitate it to draw the connection ferrule 8 out of the connection socket 11 for disconnection of the thick light guide means 20b from the light source device.

It is to be understood that although the present invention has been described with regard to a preferred embodiments thereof, various other embodiments and variants may occur to those skilled in the art, which are within the scope and spirit of the invention, and such other embodiments and variants are intended to be covered by the following claims.

What is claimed is:

1. A connection socket for detachably connecting different light guide means of endoscopes to a light source device including a light source lamp so as to couple light from the light source lamp into the light guide means, said connection socket comprising:

a socket block configured with a cylindrical aperture for insertion of a distal end of a light guide means in an axial direction of said cylindrical aperture; and retainer means installed in said socket block for holding and retaining said distal end of said light guide means inserted within said cylindrical aperture, said retainer means comprising a plurality of retainer plates which are arranged around said cylindrical aperture and each of which is pivotally mounted on a pivot shaft fixed to said socket block, respectively, and has a peripheral edge facing said cylindrical aperture that comprises a first retaining edge section at a first distance from an axis of said pivot shaft, a second retaining edge section at a second distance shorter than said first distance from said axis of said pivot shaft and a shoulder section bridging said first and said second retaining edge section;

wherein, when a distal end of a thin light guide means is inserted within said cylindrical aperture, said retainer plates hold and retain said distal end of said thin light guide means with said first retaining edge sections, thereby connecting said thin light guide means to the light source device and, when a distal end of a thick light guide means is inserted within said cylindrical aperture, said retainer plates are pushed at said shoulder section and turned about said pivot shafts, respectively, by a distal edge of said thick light guide means to bring said second retaining edge sections into close contact with said distal end of said thick light guide means so as thereby to hold and retain said distal end of said thick light guide means. thereby connecting said thick light guide means to the light source device.

2. A connection socket as defined in claim 1, wherein said shoulder section extends in the close proximity to a plane perpendicular to an axial direction of said cylindrical aperture and including said axis of said pivot shaft.

3. A connection socket as defined in claim 1, wherein said retaining means further comprises biasing means for biasing each said retainer plate against a rest position in which said retaining plate is put ready for holding said distal end of said thin light guide means.

4. A connection socket as defined in claim 1, wherein said retainer plates are arranged at regular angular intervals around said cylindrical aperture.

5. A connection socket as defined in claim 1, wherein said retainer means comprises four said retainer plates, each said retainer plate is positioned at a regular angle greater than 45° but less than 90° with respect to a vertical line perpendicular to said axial direction of said cylindrical aperture.

6. A connection socket as defined in claim 1, wherein said retainer means further comprises a roller pivotally mounted to each said retainer plate so that a circular periphery of said roller is circumscribed by extensions of both said first and said second retaining edge section.

* * * * *